United States Patent [19]

Phipps

[11] 4,364,003

[45] Dec. 14, 1982

[54] ELECTRONIC GATE CONTROL

[75] Inventor: Gregory F. Phipps, Santa Cruz, Calif.

[73] Assignees: Mary A. Baldwin, Mesa, Ariz.;
Bernard J. Favaro, Vallejo, Calif.;
Sandra Roberts, Glendale, Ariz.

[21] Appl. No.: 187,710

[22] Filed: Sep. 16, 1980

[51] Int. Cl.³ .............................................. G05B 5/00
[52] U.S. Cl. .................................... 318/467; 318/266; 318/466; 318/468
[58] Field of Search .............. 318/468, 467, 466, 265, 318/266, 267, 282, 16, 286, 445, 264, 305, 388; 49/26, 27, 28, 29, 32

[56] References Cited

U.S. PATENT DOCUMENTS

| | | | |
|---|---|---|---|
| 4,035,702 | 7/1977 | Pettersen et al. | 318/467 X |
| 4,119,896 | 10/1978 | Estes et al. | 318/266 |
| 4,234,833 | 11/1980 | Barrett | 318/468 X |
| 4,263,536 | 4/1981 | Lee et al. | 318/266 |

Primary Examiner—Ulysses Weldon
Attorney, Agent, or Firm—Lothrop & West

[57] ABSTRACT

A logic control and safety circuit for an electrically actuated gate, or the like. Upon command, a counter directs pulses from a free running oscillator of selective frequency to timer and motor control circuitry, effecting sequential gate operations. The normal gate sequence includes open, pause, and close cycles. Electromechanical and electrical safety features are included should the gate encounter an obstruction during either the open or the close cycles, or fail to complete a cycle for any reason. Automatic reset circuitry advances the gate through a "close" cycle following a power failure.

14 Claims, 5 Drawing Figures

ELECTRONIC GATE CONTROL

BACKGROUND OF THE INVENTION

1. Field of the Invention

The invention relates generally to control and safety circuitry for use with an electronically actuated gate, or door, or the like.

More specifically, the invention relates to solid state pulse generator and counter actuators to effect automatic opening, pausing and closing cycles for an electrically powered gate. Along with selective control over the duration and sequence of normal gate operation, several safety features are included, both for the gate user and for the drive mechanism of the gate itself in the event that an abnormal, or "fault" condition occurs.

2. Description of the Prior Art

Electrically powered gates, doors, and windows have been used in various applications for some time. While the earliest devices used failure prone electro-mechanical timers and relays for the determination of operational sequence and cycle duration, later designs have employed highly reliable solid state timers and solid state switches to perform the same functions. A similar development has occurred in external safety adapters designed to be used in conjunction with electrically actuated gates, or the like.

Exemplary of a solid state timing circuitry for use with an electric door is U.S. Pat. No. 4,050,189, issued to Peterson; and U.S. Pat. No. 4,035,702 issued to Petterson et al. illustrates an external solid state safety device for adaptation to an existing garage door opening and closing system.

A need still exists, however, for integrated control and safety circuitry which is reliable and simple, yet adaptable to a variety of situations where electrically operated closure apparatus is used. In other words, the prior art devices lack adaptability to satisfy the widely diverging control and safety requirements presented by a relatively slow moving and massive electrically powered gate on the one hand, and a relatively quick and light electrically powered door on the other.

Rather than adding safety features through the use of external adapters, the control circuitry of the present invention includes trigger pulse inputs which are readily interconnected with any number of safety detection devices or sensors. As a consequence, the flexible design easily provides the desired manner and extent of safety protection governing the operation of the electric gate or door without external safety circuitry.

SUMMARY OF THE INVENTION

A free running oscillator, having a selectively variable output frequency, provides operational pulses to the input of a normally disabled master control counter. The trigger signal of a treadle, photoelectric eye, or the like, introduces a start, reset, or activation pulse to the disabled counter.

The activated counter then sequentially distributes operational pulses to a number of timer and electric motor control components. Initially, a reverse control timer is actuated; next the appropriate motor field interconnection is made; and lastly, the drive motor is activated. When the gate reaches its open position, it trips a limit stop switch and the drive motor is deactivated. Subsequently, the reverse control timer completes its cycle, the motor's field relay is reversed, and the motor, now in the closing mode, is reactivated. As the gate reaches a fully closed position, the limit stop switch is again tripped and the closing cycle is terminated.

Selective control over the cycle duration of the reverse control timer ensures adequate time for safe passage through the gate before the reverse cycle is initiated.

Electro-mechanical sensors provide a first safety feature by either reversing the gate's direction or stopping the gate immediately should it encounter an object during either the opening or the closing cycle. A second safety feature includes a fault detection timer which disables both the motor and all control circuitry in the event that either an open or close cycle is not completed within a predetermined period.

In the event of a power failure during any portion of the open, pause, or close cycles, the control and timer circuitry automatically assumes a closing mode to provide gate security quickly after power is restored.

Regardless of the nature of the event precipitating a motor reversal, the control circuitry provides a pause of selective duration between the operational pulses which control the motor reversal relay and reactivation of the motor coil. In this manner, motor failure resulting from reversal voltage spikes or damage to the mechanical drive system caused by reversal during gate coasting is eliminated.

It is an object of the invention, then, to provide improved electronic control and safety circuitry for use with an electrically powered gate, door, or the like.

It is a further object to provide integrated control and safety circuitry which is readily adaptable to both the particular electrically powered gate or door and the environment in which it is intended to operate.

It is yet another object to provide a gate control and safety device which includes electric motor protection circuitry.

It is still another object to provide maximum safety and security for the operation of an electronically actuated gate or door in the event of a power failure.

It is an additional object of the invention to provide a generally improved electronic gate control.

These and other objects of the present invention will become evident from the explanations contained in the detailed description of the preferred embodiment and in the illustrations in the drawings to follow.

DETAILED DESCRIPTION OF THE PREFERRED EMBODIMENT

Figure 4:
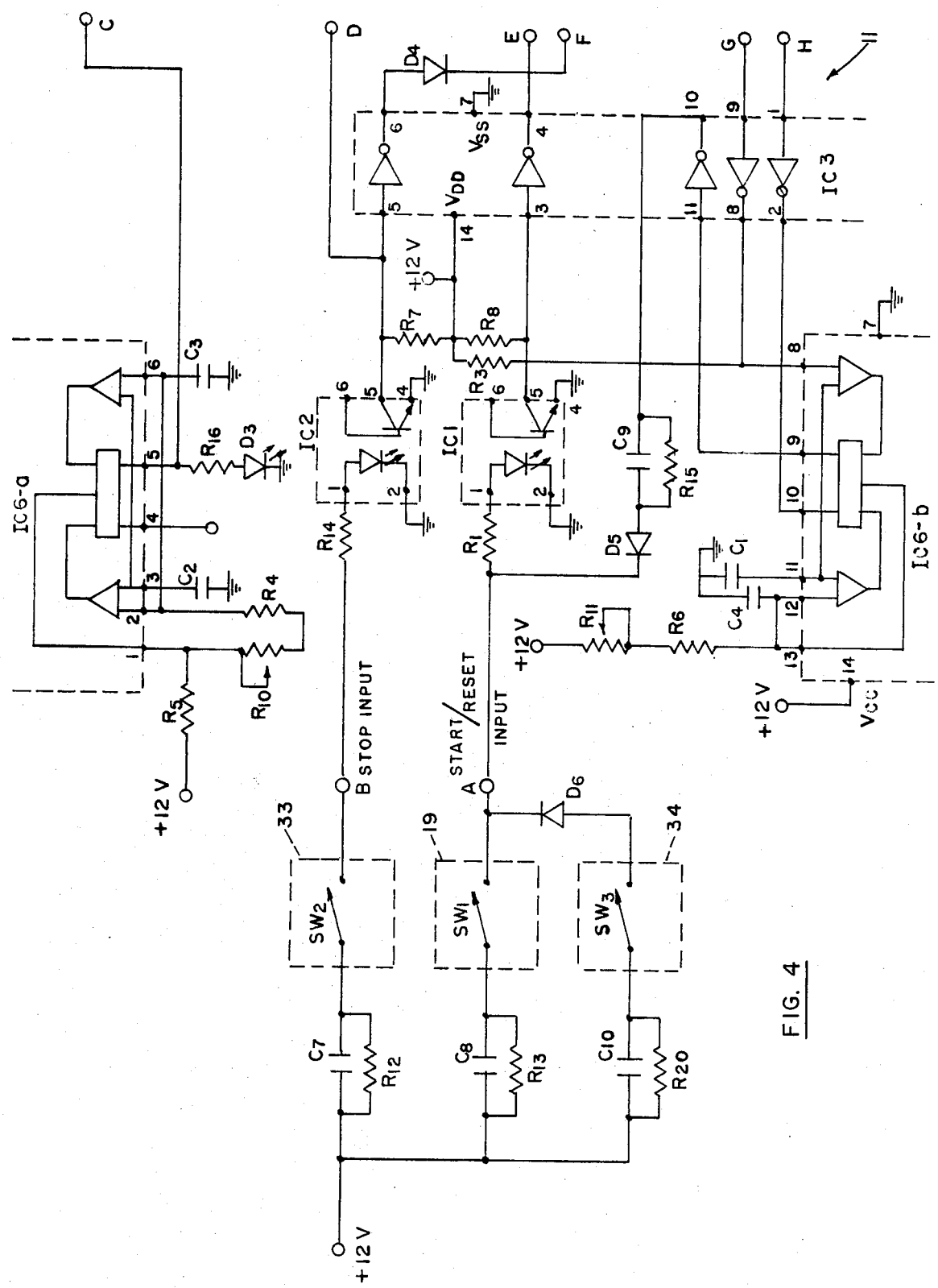
FIG. 4 is a schematic diagram, of a portion of the invention, showing the control and safety pulse generating circuitry, the pulse input circuitry, the hex inverter, the free running oscillator, and the reverse control timer.
Figure 5:
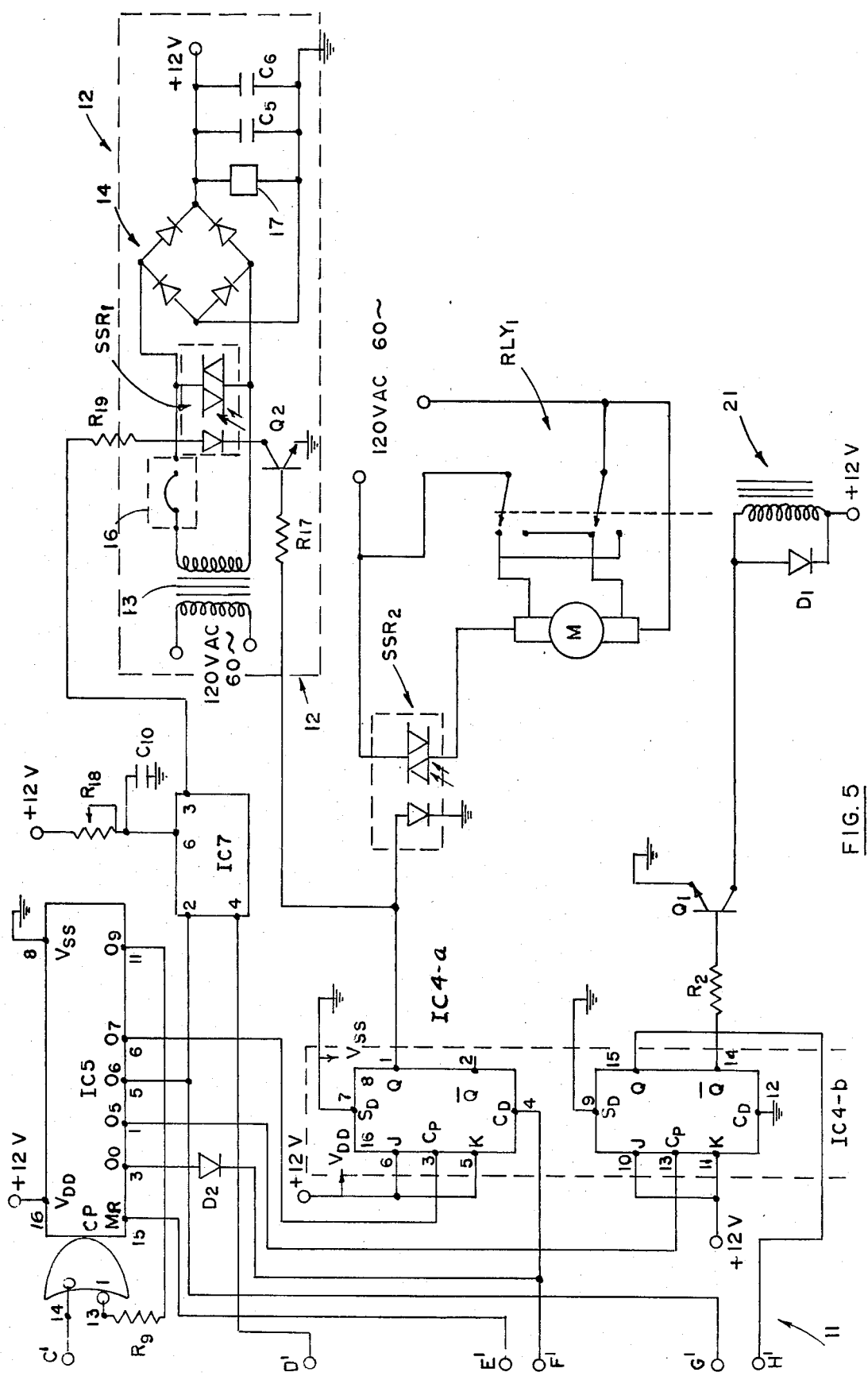
FIG. 5 is a schematic diagram of the remainder of the invention, showing the master control counter, the motor control flip-flops, the fault detection timer, and the motor reversal relay.

With particular reference to FIGS. 4 and 5, it will be evident that when the two partial schematic diagrams are placed side by side, a complete schematic diagram is provided, the interconnections being clearly indicated. Thus, the C-C′ through H-H′ terminals, inclusively, are correspondingly interconnected between the two partial schematics to complete the schematic union.

The electronic gate control of the invention is generally designated by the reference numeral 11, while the power supply, enclosed within dashed lines, is generally designated by the numeral 12.

The power supply 12 includes a transformer 13, providing low voltage alternating current to the input of a bridge rectifier 14. A manually resettable circuit breaker 16 is series connected within this low voltage A.C. circuit. An optically isolated triac $SSR_1$, commercially known as a solid state relay (SIGMA 226R1-5A1) is bridged across the low voltage A.C. circuit and is controlled by fault detection circuitry to be discussed in detail herein. A solid state voltage regulator 17 maintains the output of the bridge rectifier 14 at a constant 12 volts, and the filter capacitors $C_5$ and $C_6$ smooth out any remaining A.C. component at the power supply's output (+12 v).

The 12 volt regulated direct current output of the power supply 12 is interconnected to all points in the schematic diagram designated as "+12 v." The ground of the power supply 12 is at zero potential and is interconnected to all points in FIGS. 4 and 5 where the conventional ground symbol is indicated.

At all times when power is applied, a free running oscillator IC6-a (see top of FIG. 4) is producing square wave control pulses at its output, pin 5. IC6-a is one half of an ECG 978/556 integrated circuit, while the other half, IC6-b (see bottom of FIG. 4) comprises the reverse control timer which will subsequently be discussed.

The desired frequency of the oscillator IC6-a is selected by adjusting the trim potentiometer $R_{10}$, the RC combination of $R_{10}$, $R_4$, and $C_2$ producing control pulses which are variable in frequency from approximately 1 to 20 cycles per second. A sample of the output pulses at pin 5 of IC6-a is taken by $R_{16}$ in series with a light-emitting diode, $D_3$. The LED $D_3$, then, gives a constant visual indication of both pulse rate and proper operation of the free running oscillator IC6-a. The output pulses appear at terminal C-C′.

The master control counter IC5, (see top left of FIG. 5) an ECG 4017B, normally assumes a "waiting," or disabled mode when wired as shown. That is to say, assuming the gate 18 is in a closed position, as appears in FIG. 1, the counter IC5 produces a steady high output at $O_9$, or pin 11, of IC5. This output is fed through $R_9$ to pin 13, blocking the pulses incoming to pin 14 of IC5 from terminal C-C′ of the free running oscillator IC6-a. Until the counter IC5 is reset, then, the control pulses from IC6-a are prevented from passing through IC5 to the control pulse outputs $O_0$, $O_5$, $O_6$, and $O_7$.

Figure 1:
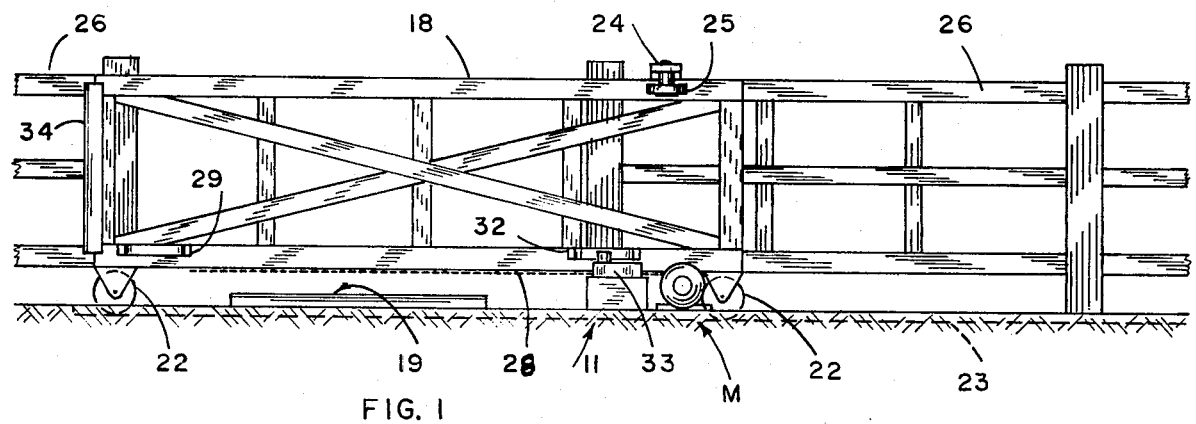
FIG. 1 is a front elevational view of a translational, electrically powered gate in closed position, together with the electric drive motor, trigger treadle, limit stop assembly and a safety edge guard.
Figure 2:
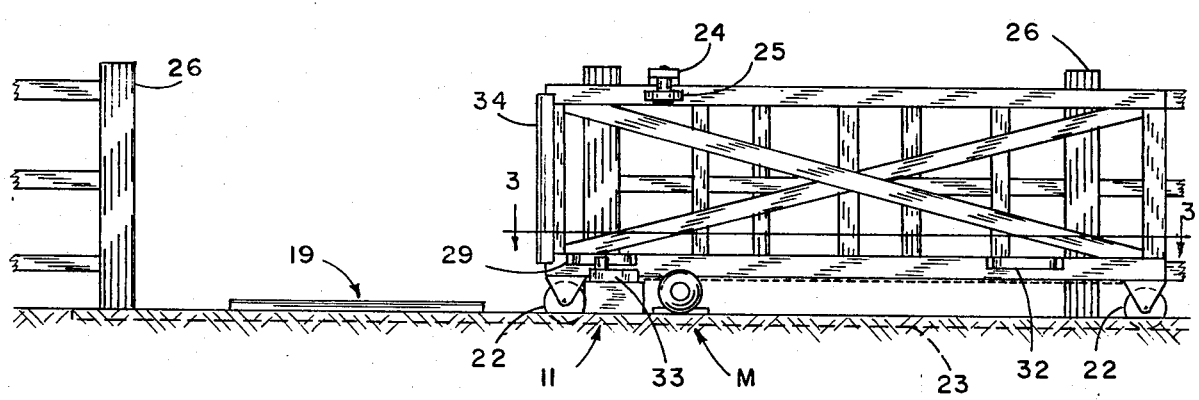
FIG. 2 is a view similar to that of FIG. 1, but with the powered gate in a fully open position, pausing for a predetermined period before the close portion of the cycle is initiated.

The gate 18 is actuated when an approaching vehicle depresses a treadle 19 (see FIG. 1), closing its internal switch $SW_1$. In lieu of the treadle 19 an inductive loop, photoelectric eye sensor, or the like, could be used, providing internal switching means similar to $SW_1$ were provided. Although a single treadle 19 is shown, a two-way gate would include two treadles, respectively placed on either side of the gate and preferably positioned to ensure that a vehicle passing through the gate would activate only the treadle on its approach side of the gate. This could be accomplished, for example, by off-setting the treadles by placing them in their respective traffic lane. For purposes of illustrating the operation of the invention, the single treadle shown in FIGS. 1 and 2 provides an adequate example.

With $SW_1$ closed, the RC combination $C_8/R_{13}$ is interconnected to the start, or reset pules input, designated A (see FIG. 4). This RC combination then discharges in rapid fashion through $R_1$ and the optically isolated transistor IC1, commonly designated a 4N28. An optically isolated transistor is chosen because it affords a substantial high voltage isolation factor between its input and output circuits. In the event that a high voltage were accidentally impressed upon the input of IC1, then, it would merely destroy IC1 and not pass the high potential pulse on to damage the rest of the circuitry.

The values of $C_8$ and $R_{13}$, namely, 1 mfd and 1 megohm, respectively, assure that the RC discharge rate will be in the nature of a single trigger, or "start" pulse through IC1. As long as $SW_1$ remains closed, only the single start pulse will be produced. The recharge rate of $C_8$ is such that a second pulse will not usually be produced by the rear tires of the vehicle passing over the treadle 19. Even if delayed passage of the vehicle produced a second pulse through IC1, it would merely reinstate the entire start sequence and allow even more time before the closing cycle begins. In other words, a subsequent start pulse, whether produced by delayed passage of an initial vehicle or the subsequent passage of a second vehicle, will merely restart the opening cycle, providing additional time for safe passage.

A start pulse through IC1 makes the output at pin 5 of IC1 go low. A hex inverter IC3 (see lower right corner of FIG. 4), commonly known as an ECG 4869, takes the low output pulse of IC1, and delivers a high output pulse to the master reset, MR, or pin 15 of the counter IC5 (see upper left corner of FIG. 5). This reset, or "clear" pulse allows the master control counter IC5 to pass one series of control pulses from the oscillator IC6-a, sequentially, through the outputs $O_0$–$O_8$, inclusively. As is evident in FIG. 5, however, only four of the control pulse outputs at $O_0$, $O_5$, $O_6$, and $O_7$ of IC5 are used in the present invention. When the counter passes to $O_9$, the steady high output again disables the counter IC5, as it waits for another reset pulse.

Each of the control pulses, $O_0$, $O_5$, $O_6$, and $O_7$, performs a specific operation and logic function, enabling the gate 18 to open, pause, and close in the intended fashion. Beginning first with the pulse produced at $O_0$, or pin 3 of IC5, an isolating diode $D_2$ passes the first control pulse to the reset input, pin 4 of IC4-a. IC4 is an ECG 4027B dual flip-flop integrated circuit, with flip-flop IC4-a switching the motor field solid state relay, $SSR_2$, and flip-flop IC4-b controlling coil 21 of the motor reverse relay, $RLY_1$. The reset pulse at pin 4 of IC4-a assures that the output $\overline{Q}$, or pin 2 of IC4-a, is high and the output at Q, or pin 1 of IC4-a, is low. Since IC4-a was similarly reset when the gate completed its previous closing cycle, this second reset pulse is merely a redundant safety measure. With $SSR_2$ thus turned off, the single phase, reversible motor M will receive no power at this time. Diode $D_4$ acts to isolate the hex inverter IC3 and associated circuitry from this first control pulse.

A second control pulse is then produced at $O_5$, or pin 1 of IC5, and is directed to the control pulse input $C_p$, pin 13 of IC4-b. This second control pulse flops IC4-b to a $\overline{Q}$ high output condition, passing current through $R_2$ and biasing on the transistor $Q_1$, a 2N3643. Current can thereby flow through the coil 21 of the motor reverse relay $RLY_1$, placing the field of the motor M into a forward drive mode. Diode $D_1$ is connected in parallel across the coil 21 to prevent relay voltage transients from damaging the transistor $Q_1$.

Simultaneously, Q or pin 15 of IC4-b assumes a low output condition, and the inverted output is fed to the clear, or reset input, pin 10, of IC6-b. This reset signal places the reverse control timer IC6-b into a "ready" condition for receiving an actuation pulse from the master control counter, IC5.

The third control pulse is passed from $O_6$, or pin 5 of IC5, and actuates two independent timers, namely, the reverse control and fault detection timers. The third control pulse from $O_6$ passes first through the hex inverter IC3 and then to pin 8 of the reverse control timer IC6-b, activating the timer circuitry. IC6-b is running in a "one-shot," or monostable mode, producing a high output condition at pin 9 of IC6-b for a predetermined period following the activation pulse.

The reverse control timer period is determined by the operating parameters of the gate. That is to say, the RC combination of a 2.5 megohm trim potentiometer $R_{11}$ and a fixed 0.1 mfd capacitor $C_1$, is adjustable to allow a sufficient time for the gate to open fully, come to rest, and pause for vehicle passage before reversing to close again. The distance from the treadle to the gate and the customary speed of the vehicle between the treadle and the gate can be coordinated with the RC circuit so that when the vehicle actuates the treadle and continues toward the gate, the gate will be fully open to allow the vehicle to pass through without pause or change of speed. In many instances, however, the vehicle will stop momentarily after actuating the treadle, and await the opening of the gate before proceeding to pass through the gate.

The second timer which is simultaneously activated by the control pulse from $O_6$ of IC5 is the fault condition timer, IC7, commonly known as a 555 integrated circuit. The operation and function of this second timer will be discussed in the safety feature explanation to follow.

The fourth pulse is produced at $O_7$, or pin 6, of IC5 and fed to the control pulse input $C_p$, pin 3, of the IC4-a flip-flop. IC4-a, which was previously reset to a high output condition at $\overline{Q}$, now flips to a high output condition at Q, or pin 1, actuating the motor field solid state relay, $SSR_2$. The Potter Brumfield SR1207B solid state relay has proved to be eminently satisfactory for the $SSR_2$ herein, although any solid state relay capable of handling the starting and running currents of the motor M should perform equally well. Main line alternating current of 120 VAC is thereby applied across the field of the motor M.

The counter IC5 next passes to $O_9$ or pin 11, and produces a steady high output condition which disables the counter until a new reset pulse is received at pin 15 of IC5. In other words, following the initial master reset pulse produced by depressing the treadle 19, only one series of operational pulses is allowed to pass through the counter before it is again disabled. During the remainder of the gate's normal open and pause cycles, then, the master control counter IC5 merely assumes a "waiting" or "stand by" condition.

With reference to FIG. 1, two support wheels 22 are positioned under the respective extremities of the gate 18. The two wheels register and roll within an elongated channel 23, the top edge of which is flush with the ground to present a smooth surface to passing vehicles. A guide brace 24 is attached to the adjacent portion of a fence 26 and includes dual rollers 25 which straddle the top edge of the gate 18. The brace 24 maintains the gate 18 in an erect position, sufficiently spaced from the fence 26 to preclude binding between the two (see FIG. 3). A conventional rack 28 and a pinion 27 are used to transform the rotational motion of the motor M into lateral translation of the gate 18. With motor M running in its forward, or gate opening, direction, the gate progresses laterally towards a fully open position as shown in FIG. 2.

Figure 3:
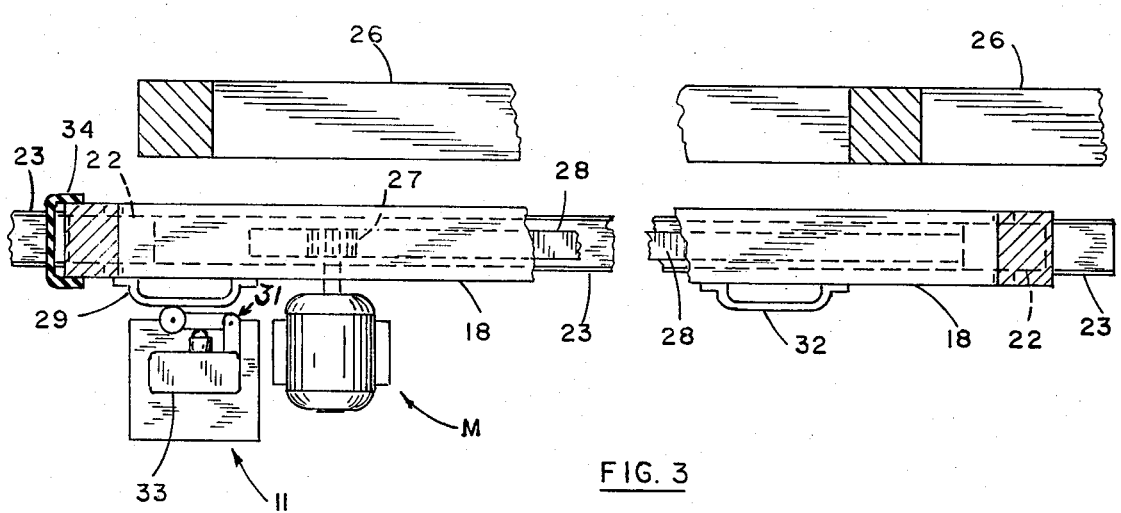
FIG. 3 is a fragmentary view, showing the limit switch cammed into closed position by the "open" limit bumper, the view being taken on the line 3—3 in FIG. 2.

FIG. 3 illustrates the operation of the limit stop switch, 33, in conjunction with the limit stop bumper 29. When the gate 18 approaches a fully open position, the limit stop bumper 29 first engages and then urges the pivoted lever portion of a limit stop switch extension 31 into engagement with the external contact of a limit stop switch 33, thereby closing the contacts of its internal switch $SW_2$. The RC combination $C_7$ and $R_{12}$, 1 mfd and 1 megohm, respectively, is thereby connected through $SW_2$ to the "stop" pulse input, designated B (see FIG. 4).

This "stop" pulse is fed first through $R_{14}$, and then to the optically isolated transistor IC2, a 4N28. Identical with the operation of IC1, previously described, the low output pulse of the actuated transistor in IC2 is inverted through hex inverter IC3 to a high pulse. Diode $D_4$ then delivers the pulse to the "clear," or reset pin 4 of IC4-a. Diode $D_2$ isolates IC5 from this stop pulse. IC4-a flops to a $\overline{Q}$ high output condition at pin 2 and a Q low output at pin 1, thereby deactivating motor field relay $SSR_2$ and shutting off the drive motor M, with the gate 18 now fully open.

Since the gate 18 has considerable mass, a certain amount of coasting will occur following motor shutoff. To accommodate this coasting, the limit stop bumper 29 is somewhat horizontally elongated to assure that the limit switch 33 and the contacts of the $SW_2$ remain closed when the gate 18 finally comes to rest (see FIG. 3). As long as the switch $SW_2$ remains closed, only a single "stop" pulse will be produced. It will be appreciated that if the coasting movement of the gate were to exceed the illustrated engagement of the limit stop bumper 29 with the lever portion of the switch extension 31, the switch $SW_2$ would open, with the result that a second, unwanted, "stop" pulse would be produced when the gate reverses direction.

Having pre-programmed the reverse control timer IC6-b to allow sufficient time for a vehicle to pass by the opened gate, the gate close cycle begins at the appointed moment. When IC6-b times out, the extended pulse or high output condition at pin 9 of IC6-b goes low. This reverse control pulse is then inverted through hex inverter IC3 to charge quickly the RC combination, $C_9$ and $R_{15}$, 1 mfd and 1 megohm, respectively. The companion discharge pulse passes through isolation diode $D_5$, IC1, and IC3 to reset the master control counter IC5 at the MR pin 15.

The reset counter IC5 again allows one series of sequential control pulses to pass through the outputs $O_0$, $O_5$, $O_6$, and $O_7$, before the high output at $O_9$ disables the counter once again.

The pulse from $O_0$ redundantly clears IC4-a, thereby producing a high output condition at $\overline{Q}$. The following pulse from $O_5$ flips IC4-b to a high output condition at Q. The high output at Q of IC4-b is inverted by hex inverter IC3 and delivered to the reset input, or pin 10 of IC6-b, preventing the reverse control timer IC6-b from being triggered by a subsequent control pulse. In other words, the reverse control timer is thereby disabled during the "close" cycle to preclude the initiation of a new "open" cycle following gate closure.

With $\overline{Q}$ of IC4-b now at a low condition, transistor $Q_1$ is turned off and $RLY_1$ is de-energized. The field windings of motor M are thereby placed in a reverse drive mode. The next pulse, from $O_6$, triggers a "fault" condition timer IC7, but cannot actuate the now disabled reverse control timer IC6-b. The following pulse from $O_7$ of master control counter IC5 flips IC4-a to a high output at Q, activating motor field relay $SSR_2$ and placing the motor M into a "reverse" running mode, causing the gate 18 to translate toward the closed position shown in FIG. 1. As the switch bumper 29 separates from the pivoted lever portion of the switch extension 31, the limit stop switch $SW_2$ opens.

With the gate 18 approaching a fully closed position, a "close" limit bumper 32 (see FIG. 3) is provided to cam the pivoted lever on the extension 31 of the limit switch 33 inwardly and thereby again close the internal switch contacts $SW_2$. The size, shape, and operation of the bumper 32 are identical to that of the bumper 29. As is most clearly shown in FIGS. 1 and 3, however, the bumper 29 is affixed to the left hand, or leading edge of the gate 18 while the bumper 32 is attached near the right hand, or trailing edge of the gate 18. The bumpers 29 and 32, then, act to limit the "opening" and "closing" gate cycles, respectively. Thus, as the gate 18 assumes a fully closed position as shown in FIG. 1, a stop pulse produced by the closed contacts of the switch $SW_2$ clears IC4-a, flops $\overline{Q}$, or pin 2, of IC4-a into a high output condition, and deactivates motor M in a manner already described.

Having discussed the normal "open," "pause," and "close" cycles for the gate, attention now will be directed towards the safety features and operation of the invention during a number of "fault" situations.

A primary safety feature is provided by a rubberized vertical edge guard 34, attached to the left hand extremity of the gate 18 (see FIGS. 1 and 2). The somewhat resilient guard 34 includes an internal switch $SW_3$, whose contacts close whenever the guard 34 comes into contact with an object.

If an object is encountered by the guard 34 during a closing cycle, $SW_3$ will close, sending a "start" pulse through an isolating diode $D_6$ to the start, or reset, pulse input A. Just as if a new "open" cycle were being initiated, the master control counter IC5 will be reset by the start pulse fed to its pin 15. All of the normal "opening" sequence control pulses are produced, the first resulting in an immediate immobilization of the gate when IC4-a is cleared, and the Q output at pin 1 goes low. As the control pulses sequentially progress, the gate will reopen to a normally full open position, stop, and pause until the reverse control timer IC6-b times out.

If the object is still in the path of the gate by the time it reverses to close again, the entire sequence will repeat itself, as just described.

Another variation would be to interconnect $SW_3$ through the isolating diode $D_6$ to the stop pulse input B. Upon encountering an object when closing, the gate 18 would merely stop, immediately, in its semi-closed position, and remain stopped. It would then require a new start, or reset pulse to "clear" the gate's cycle, for it would otherwise reopen fully, and then pause, attempting to close again.

It will be appreciated that a plurality of edge guards 34 may be desirable in a particular situation. For instance, an edge guard could be placed on the right hand extremity of the gate 18. If this were done, the internal switch would be interconnected through an appropriate isolating diode to the "stop" pulse input B. Upon encountering an object while opening, then, the gate would immediately stop. After the reverse control timer IC6-b timed out, a normal close cycle would ensue, and the gate would return to a fully closed position and come to rest.

If the gate 18 were of the swinging rather than the "sliding" or translational variety, as shown, guards would be desirable both on the "opening" side of the gate and the "closing" side of the gate. Also, guards in this application should be horizontally positioned to extend the full longitudinal aspect of the gate to assure complete protection. The contacts of the guard on the "opening" side of the gate could be interconnected to the "stop" pulse input B, and the contacts of the guard on the "closing" side of the gate could be interconnected to the start, or restart, pulse input A. As previously discussed, however, the internal switch of the guard on the "closing" side of the gate could also be interconnected to the "stop" pulse input B. The chief advantage of this approach is that for the gate to close, the user of the gate must purposefully initiate a gate "opening" cycle, assuring that the interfering object has first been removed.

The invention, then, is easily adaptable to provide whatever safety features are required for a particular electric gate, or door. And, the adaptation merely requires a simple interconnection of the safety sensor(s) through an isolation diode(s) with the existing primary control input(s), namely the start, or reset pulse input A and the stop pulse input B. Thus, the same control and logic circuitry used for normal gate operation is readily interconnected and fully compatible with external safety sensors, such as the guards.

Regardless of the number of external safety sensors which may be used, an internal fault detection timer assures an additional measure of safety. As discussed, each time the master control counter IC5 is reset, one series of control pulses is sequentially produced at the outputs $O_0$, $O_5$, $O_6$, and $O_7$. The control pulse at $O_6$, or pin 5, of IC5 is directed to both the reverse control timer IC6-b, and the "fault" condition timer IC7. The purpose of IC7 is to remove all power from the invention in the event that either an opening or a closing cycle is not completed within a preselected period of time.

IC7 is a 555 integrated circuit, interconnected as a timer controlled by the RC combination: $R_{18}$ (2.5 megohm trimmer potentiometer) and $C_{10}$ (1 mfd). These values allow the "fault" condition timer to be selectively adjusted for a duration slightly longer than that required for the gate either to open or to close, yet slightly less than that of the reverse control timer IC6-b.

Without the timer IC7, if the mechanism moving the gate were to fail during an opening cycle, for example, a failure of the rack and pinion structure, the motor M would continue to run indefinitely, since the gate would never reach the position necessary to trip the limit stop switch 33. But with IC7 included, as shown in FIG. 5, all power, particularly to the motor M, will be cut off when the "fault" condition timer IC7 completes its cycle.

After IC7 is triggered, the output at its pin 3 goes low. During a fault condition, and after the predetermined period has elapsed, however, it returns to a high output condition. Q, or pin 1, of IC4-a, meanwhile, is also high, biasing on transistor Q2 (2N3643) in the power supply 12. Current thereby flows through $Q_2$, turning on the solid state relay $SSR_1$. A short circuit is created across the low voltage output winding of the transformer 13, causing the manually resettable circuit breaker 16 to trip. Normal operation will not resume until the circuit breaker is manually reset, assuring that the initiating fault condition has been corrected.

The duration of the timer IC7 is longer than the period necessary for the gate either to open or to close. During a normal opening cycle, the "stop" pulse, produced when the gate reaches a fully open position, is sampled before reaching pin 5 of the hex inverter IC3 and fed through D-D' to the "clear" pin 4 of IC7. The "fault" condition timer IC7 is thereby disabled before it can actuate $SSR_1$, assuring that an uninterrupted closing cycle can follow. Similarly, when the "fault" condition timer IC7 is retriggered for the gate closing cycle, the stop pulse from the limit stop switch 33 disables the "fault" condition circuitry before IC7 times out.

Of course, to be most effective, the "fault" condition timer IC7 must be set for a duration shorter than that of the reverse control timer IC6-b. Otherwise, following an opening cycle, the reverse control timer IC6-b will issue a reset pulse and cause a sequence of reverse control pulses to issue from IC5, which, in turn, will retrigger IC7 and delay the power shutdown until IC7 finally times out.

If the edge guard 34 encounters an object while the gate 18 is closing, the motor M must undergo an immediate reversal of direction. It is well-known that the voltage spikes produced by too rapid a reversal can cause field winding breakdown in a motor. Also, too rapid a reversal could precipitate a mechanical failure in the rack 28 and pinion 27 drive mechanism.

The present embodiment avoids such undesirable consequences. That is to say, the selective pulse rate of the oscillator IC6-a, in combination with the sequential distribution of control pulses through the master control counter IC5, assures that an adequate period of time will pass before reversal of the motor M can occur. Since the frequency of control pulses from IC6-a is continuously variable from 1 to 20 cycles per second, and the rate of counter pulse distribution is directly dependent upon the frequency of IC6-a, any motor and gate combination can be easily accommodated for responsive, yet safe reversal.

The operation of the invention 11 following a power interruption provides still another safety and security feature. Whether the power failure occurs during an opening or closing cycle, the gate 18 will automatically close upon reapplication of power. Characteristic of the dual flip-flop ECG 4027B (IC4-a and IC4-b), a $\overline{Q}$ high output condition occurs at both pins 2 and 14 upon reinstating power. When the master control counter IC5 is repowered, it allows one series of control pulses to pass, in the same fashion as if it had just been reset.

The control pulses sequentially flip IC4-b and then IC4-a to a $\overline{Q}$ high output condition at pins 14 and 1, respectively. This disables the reverse control timer, interconnects the motor M into a reverse mode, and applies power to the motor M. The gate 18 then assures a closing cycle and, as before, comes to a fully closed position.

It will therefore be appreciated that the described invention provides the control and safety features necessary for proper operation of an electrically actuated gate or door with the distinct advantage of ready adaptability to a variety of practical applications, apparatus, and safety requirements.

I claim:

1. A control device for use with a gate having an opening and closing system which includes a reversible electric drive motor, comprising:
   a. detector means for providing a first start pulse, initiating the gate opening cycle;
   b. oscillator means for producing repetitive control pulses;
   c. control counter means interconnected to said oscillator means for sequential distribution of a predetermined series of opening control pulses in response to said first start pulse, and for sequential distribution of a predetermined series of closing control pulses in response to a second start pulse, for controlling the opening cycle and the closing cycle, respectively;
   d. motor direction control means, responsive to a first opening control pulse for interconnecting the motor field in a forward drive mode, and responsive to a first closing control pulse for interconnecting the motor field in a reverse drive mode;
   e. reverse control timer means, activated by a second opening control pulse for producing said second start pulse to initiate, following said opening cycle and a pause cycle, said predetermined series of closing control pulses;
   f. motor actuation means responsive both to a third opening control pulse and to a third closing control pulse, for activating the motor during said opening and closing cycles, respectively; and,
   g. limit stop means for sensing a fully open position of the gate and deactivating said motor actuation means for terminating said opening cycle, and for sensing a fully closed position of the gate and deactivating said motor activation means for terminating said closing cycle.

2. A device as in claim 1 wherein said motor direction control means includes a first flip-flop interconnected to a motor field reverse relay, said first flip-flop being switched in response to said first opening control pulse and in response to said first closing control pulse, for placing said motor field relay and the drive motor into forward and reverse drive modes, respectively.

3. A device as in claim 2 wherein a reset input of said reverse control timer means is responsive to said first flip-flop during said opening cycle to prepare said reverse control timer means for activation by said second opening control pulse, and said reset input is further responsive to said first flip-flop during said closing cycle to disable said reverse control timer means to prevent said reverse control timer means from being activated by said second closing control pulse.

4. A device as in claim 3 wherein said motor actuation means includes a second flip-flop interconnected to a high voltage solid state relay, said second flip-flop being switched in response to said third opening control pulse and said limit stop means, defining said opening cycle, and further being switched in response to said third closing control pulse and said limit stop means, defining said closing cycle.

5. A device as in claim 1 wherein said limit stop means includes a switch, an open limit bumper, and a close limit bumper, said open limit bumper being attached to one end of the gate and said close limit bumper being attached to the other end of the gate, whereby said switch is actuated by said open limit bumper when the gate slides to a fully open position, and said switch is again actuated by said close limit bumper when the gate slides to a fully closed position.

6. A device as in claim 1 including safety detector means interconnected to said motor actuation means for deactivating said motor actuation means if the gate encounters an object during said opening cycle.

7. A device as in claim 1 including safety detector means interconnected to said motor actuation means for deactivating said motor actuation means if the gate encounters an object during said closing cycle.

8. A device as in claim 6 or 7, wherein said safety detector means includes a pressure sensitive switch attached to the edge of the gate encroaching upon an object for sensing an encounter with an object.

9. A device as in claim 1 including safety detector means interconnected to said control counter means for producing a first start pulse and initiating said opening cycle if the gate encounters an object during said closing cycle.

10. A device as in claim 9 wherein said safety detector means includes a pressure sensitive switch attached to the closing edge of the gate for sensing an encounter with an object.

11. A device as in claim 1 wherein said oscillator means is of selective, variable frequency, ranging from 1 to 20 cycles per second thereby determining the rate of sequential distribution of said opening control pulses and said closing control pulses by said control counter means.

12. A device as in claim 1 including a fault condition timer means actuated by said second opening control pulse and reset by said limit stop means at the termination of said opening cycle, the duration of said fault condition timer means being selectively adjustable for a first period longer than said opening cycle, whereby power is interrupted to both the control device and the motor during the opening cycle if said fault condition timer means is not reset by said limit stop means before said first period elapses during said opening cycle.

13. A device as in claim 1 including a fault condition timer means actuated by said second closing control pulse and reset by said limit stop means at the termination of said closing cycle, the duration of said fault condition timer means being selectively adjustable for a second period longer than said closing cycle, whereby power is interrupted to both the control device and the motor during the closing cycle, if said fault condition timer means is not reset by said limit stop means before said second period elapses.

14. A device as in claim 12 or 13 including a manually resettable circuit breaker responsive to said fault condition timer means for interruption of the power to both the control device and the motor.

* * * * *